United States Patent
Chen et al.

(10) Patent No.: US 10,698,829 B2
(45) Date of Patent: Jun. 30, 2020

(54) DIRECT HOST-TO-HOST TRANSFER FOR LOCAL CACHE IN VIRTUALIZED SYSTEMS WHEREIN HOSTING HISTORY STORES PREVIOUS HOSTS THAT SERVE AS CURRENTLY-DESIGNATED HOST FOR SAID DATA OBJECT PRIOR TO MIGRATION OF SAID DATA OBJECT, AND SAID HOSTING HISTORY IS CHECKED DURING SAID MIGRATION

(71) Applicant: Datrium, Inc., Sunnyvale, CA (US)

(72) Inventors: Mike Chen, Cupertino, CA (US); Boris Weissman, Palo Alto, CA (US)

(73) Assignee: Datrium, Inc., Sunnyvale, CA (US)

( * ) Notice: Subject to any disclaimer, the term of this patent is extended or adjusted under 35 U.S.C. 154(b) by 156 days.

(21) Appl. No.: 15/220,407

(22) Filed: Jul. 27, 2016

(65) Prior Publication Data

US 2017/0031825 A1 Feb. 2, 2017

Related U.S. Application Data

(60) Provisional application No. 62/197,546, filed on Jul. 27, 2015.

(51) Int. Cl.
G06F 12/0871 (2016.01)
G06F 9/455 (2018.01)
G06F 12/0813 (2016.01)
G06F 12/0811 (2016.01)

(52) U.S. Cl.
CPC ...... *G06F 12/0871* (2013.01); *G06F 9/45558* (2013.01); *G06F 12/0811* (2013.01); *G06F 12/0813* (2013.01); *G06F 2009/4557* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS

| | | | | |
|---|---|---|---|---|
| 6,154,811 | A * | 11/2000 | Srbljic | G06F 12/0813 711/118 |
| 6,353,836 | B1 | 3/2002 | Bamford et al. | |
| 7,315,919 | B1 * | 1/2008 | O'Krafka | G06F 12/0817 711/141 |
| 7,640,408 | B1 * | 12/2009 | Halligan | G06F 3/0617 711/162 |

(Continued)

*Primary Examiner* — William B Partridge
*Assistant Examiner* — Chie Yew
(74) *Attorney, Agent, or Firm* — Hickman Palermo Becker Bingham LLP

(57) ABSTRACT

A request is received to access at least one data unit of a larger data object by an entity within a local host, which is then queried to determine if the requested data unit is present. If the requested data unit is present in the local cache, it is fetched from the local cache. If the requested data unit is not present in the local cache, however, a respective cache within at least one target host, which is different from the local host, is queried to determine if the requested data unit is present remotely and, if so, the data unit is fetched from there instead. If the requested data unit is not present in the local cache or the cache of the target host, the data unit is fetched from a common data storage pool.

30 Claims, 2 Drawing Sheets

(56) References Cited

U.S. PATENT DOCUMENTS

| | | | |
|---|---|---|---|
| 2002/0004890 A1* | 1/2002 | Ofek | G06F 3/0607 |
| | | | 711/161 |
| 2005/0138091 A1* | 6/2005 | Bono | G06F 17/30067 |
| 2005/0283489 A1* | 12/2005 | Shiozawa | G06F 17/30067 |
| 2006/0288019 A1* | 12/2006 | Bauer | G06F 9/44521 |
| 2007/0233698 A1* | 10/2007 | Sundar | G06F 8/60 |
| 2008/0222375 A1* | 9/2008 | Kotsovinos | G06F 9/5083 |
| | | | 711/162 |
| 2009/0157678 A1* | 6/2009 | Turk | G06F 17/30289 |
| 2012/0110293 A1* | 5/2012 | Yang | G06F 9/45558 |
| | | | 711/170 |
| 2012/0240110 A1* | 9/2012 | Breitgand | G06F 9/45558 |
| | | | 718/1 |
| 2012/0284471 A1* | 11/2012 | Hur | G06F 3/0617 |
| | | | 711/162 |
| 2012/0304168 A1* | 11/2012 | Raj Seeniraj | G06F 8/38 |
| | | | 718/1 |
| 2014/0280664 A1* | 9/2014 | Sengupta | H04L 67/2842 |
| | | | 709/212 |
| 2016/0350226 A1* | 12/2016 | Agarwal | G06F 12/0813 |

* cited by examiner

DIRECT HOST-TO-HOST TRANSFER FOR LOCAL CACHE IN VIRTUALIZED SYSTEMS WHEREIN HOSTING HISTORY STORES PREVIOUS HOSTS THAT SERVE AS CURRENTLY-DESIGNATED HOST FOR SAID DATA OBJECT PRIOR TO MIGRATION OF SAID DATA OBJECT, AND SAID HOSTING HISTORY IS CHECKED DURING SAID MIGRATION

CROSS-REFERENCE TO RELATED APPLICATIONS

This application claims priority of U.S. Patent Application 62/197,546, filed 27 Jul. 2015.

BACKGROUND

Caching is a common technique in computer systems to improve performance by enabling retrieval of frequently accessed data from a higher-speed cache instead of having to retrieve it from slower memory and storage devices. Caching occurs not only at the level of the CPU itself, but also in larger systems, up to and including caching in enterprise-sized storage systems or even potentially globally distributed "cloud storage" systems. Access to cached information is faster—usually much faster—than access to the same information stored in the main memory of the computer, to say nothing of access to information stored in non-solid-state storage devices such as a hard disk.

On a larger scale, dedicated cache management systems may be used to allocate cache space among many different client systems communicating over a network with one or more servers, all sharing access to a peripheral bank of mass-storage devices. This arrangement may also be found in remote "cloud" computing environments.

Data is typically transferred between memory (or another storage device or system) and cache as cache "lines", "blocks", "pages", etc., whose size may vary from architecture to architecture. In systems that have a caching hierarchy, relatively fast memory (such as RAM) may be used to cache slower memory (such as storage devices). Just for the sake of succinctness, all the different types of information that are cached in a given system are referred to commonly here as "data", even if the "data" comprises instructions, addresses, metadata, etc. Transferring blocks of data at a time may mean that some of the cached data will not need to be accessed often enough to provide a benefit from caching, but this is typically more than made up for by the relative efficiency of transferring blocks as opposed to data at many individual memory locations; moreover, because data in adjacent or close-by addresses is very often needed ("spatial locality"), the inefficiency is not as great as randomly distributed addressing would cause. A common structure for each entry in the cache is to have at least three elements: a "tag" that indicates where (generally an address) the data came from in memory; the data itself; and one or more flag bits, which may indicate, for example, if the cache entry is currently valid, or has been modified.

Regardless of the number, type or structure of the cache(s), the standard operation is essentially the same: When a system hardware or software component needs to read from a location in storage (main or other memory, a peripheral storage bank, etc.), it first checks to see if a copy of that data is in any cache line(s) that includes an entry that is tagged with the corresponding location identifier, such as a memory address. If it is (a cache hit), then there is no need to expend relatively large numbers of processing cycles to fetch the information from storage; rather, the processor may read the identical data faster—typically much faster—from the cache. If the requested read location's data is not currently cached (a cache miss), or the corresponding cached entry is marked as invalid, however, then the data must be fetched from storage, whereupon it may also be cached as a new entry for subsequent retrieval from the cache.

There are two traditional methods for tagging blocks in a cache. One is to name them logically, such as using a Logical Block Address (LBA) within some data object, file, virtual disk, or other logical entity. One drawback of this method is that when a remote host asks for the block at, say, LBA 18, it is difficult to determine if the block for LBA 18 that the remote host has is current or has been overwritten with new content. This problem of ensuring consistency is especially hard in the face of failures such as a host going out of communication for a while.

The second approach is to name blocks by their storage location. Traditional systems which update data in place have the same consistency issue as with LBA-tagged arrangements. Log structured file systems are better in this second case because new content would have been written to a new location, such that if a block stored at address X is needed and the remote host has that block, the correct data will be referenced. But, if the block has been moved, for example as part of a garbage collection process, its storage location will change and although the remote cache may have the correct data, the address will be wrong. The host will therefore reply that it does not have the data, when it actually does.

A third, more recent approach, is to tag data by its content, sometimes called a content-addressable cache. In this approach, the tag depends only on the content of the data, such as, for example, a SHA-1 cryptographic fingerprint of the data.

Three issues commonly arise when considering the design of a caching system. The first issue is memory hierarchy: Each memory technology represents a different choice on the cost-performance tradeoff spectrum—faster memory tends to be more expensive than slower memory. Host caches will tend to be made of faster, but more expensive memory. Accessing data from this faster memory as often as possible will make the VMs go faster.

The second issue is proximity: Data in a local cache can be accessed more quickly than data stored in a remote system. Each host therefore typically has a local cache so that it has to do a remote fetch as infrequently as possible.

The third issue is scalability. Suppose several hosts are able to address a common storage pool. A host that has a cache miss can go to the pool, which may include its own caching arrangement. If there are many hosts with lots of misses, the combined load could overwhelm the pool and cause queuing delays which would slow down the response back to the hosts. In some systems, each host has its own local cache. Such systems need to ensure that the local host caches remain consistent: they must always serve up the logically correct, current version of the data. The standard approach to solving this problem is for each host to coordinate with a central server to make sure that the version of data it has is up to date. This approach has the advantage of letting the hosts operate without communicating amongst themselves, but it generally does not let one host benefit from the data being in another host's cache. It is possible for the central server to keep track of what every host is caching, and redirect a request from one host to another, but this approach does not scale well.

In other of these systems, the hosts pool their local cache resources to create a larger, virtual cache. In such systems, the hosts communicate amongst themselves so that the hosts know which other host may have the data needed in its cache and ensure the consistency of the caches. Such communication can also have scalabilty issues, increasing the load on each server just to maintain cache consistency and a form of global location table so that needed data can be found. Further, it can make the performance of one host tied to the performance of other hosts. This interdependence can make performance troubleshooting very difficult.

What is needed is thus a system that improves the ability of a storage system to provide data proximity, that keeps needed data in a host's local cache whenever possible and, that provides scalability, that keeps the inter-host communication load to a minimum, that does not make a single central server a bottleneck, and yet that ensures data consistency so that each host always serves up the correct data. Ideally, such a system should enable these features even in the presence of different memory technologies.

DETAILED DESCRIPTION

In broad terms, in a system in which multiple hosts access a common storage pool and each includes a local cache, embodiments of this invention enable hosts to access the caches of other hosts, thereby spreading the load of cache misses, which may in many cases reduce queuing delays, while at the same time requiring no inter-host communication on new data writes or when data for reads is in the local cache, and little inter-host communication to support one host being able to access data in other's cache in the event that data is not in the local cache but is in another host's cache. The novel procedures and structures for this host-to-host cache access system are described in detail below. Before that, however, the system context in which the invention will typically be implemented is first illustrated and described.

Co-pending U.S. patent application Ser. No. 14/464,733 ("Hardware Resource Configuration Information Interface"); Ser. No. 14/520,610 ("Data Reconstruction in Distributed Data Storage System with Key-Based Addressing"); Ser. No. 14/568,700 ("Alternate Storage Arrangement in a Distributed Data Storage System with Key-Based Addressing"); and Ser. No. 15/177,342 ("System and Methods for Storage Data Deduplication") describe various characteristics of a storage system that avoids many of the problems of the prior art by employing content addressing. One feature, for example, is fingerprinting, in which one host asks another if it has a block with a particular fingerprint (or a block in a group of blocks). If the remote cache has the desired content, the system can simply respond with the data without worrying about whether the logical block has been overwritten, or whether the block has been moved, or whether the block is in the cache for a particular disk or because some other disk with the duplicate block first fetched the block. These applications, which are co-owned with this one, and also share at least one inventor, are incorporated herein by reference, although the embodiments of the present invention described below may operate in systems other than the ones described in those co-pending patent applications.

Figure 1:
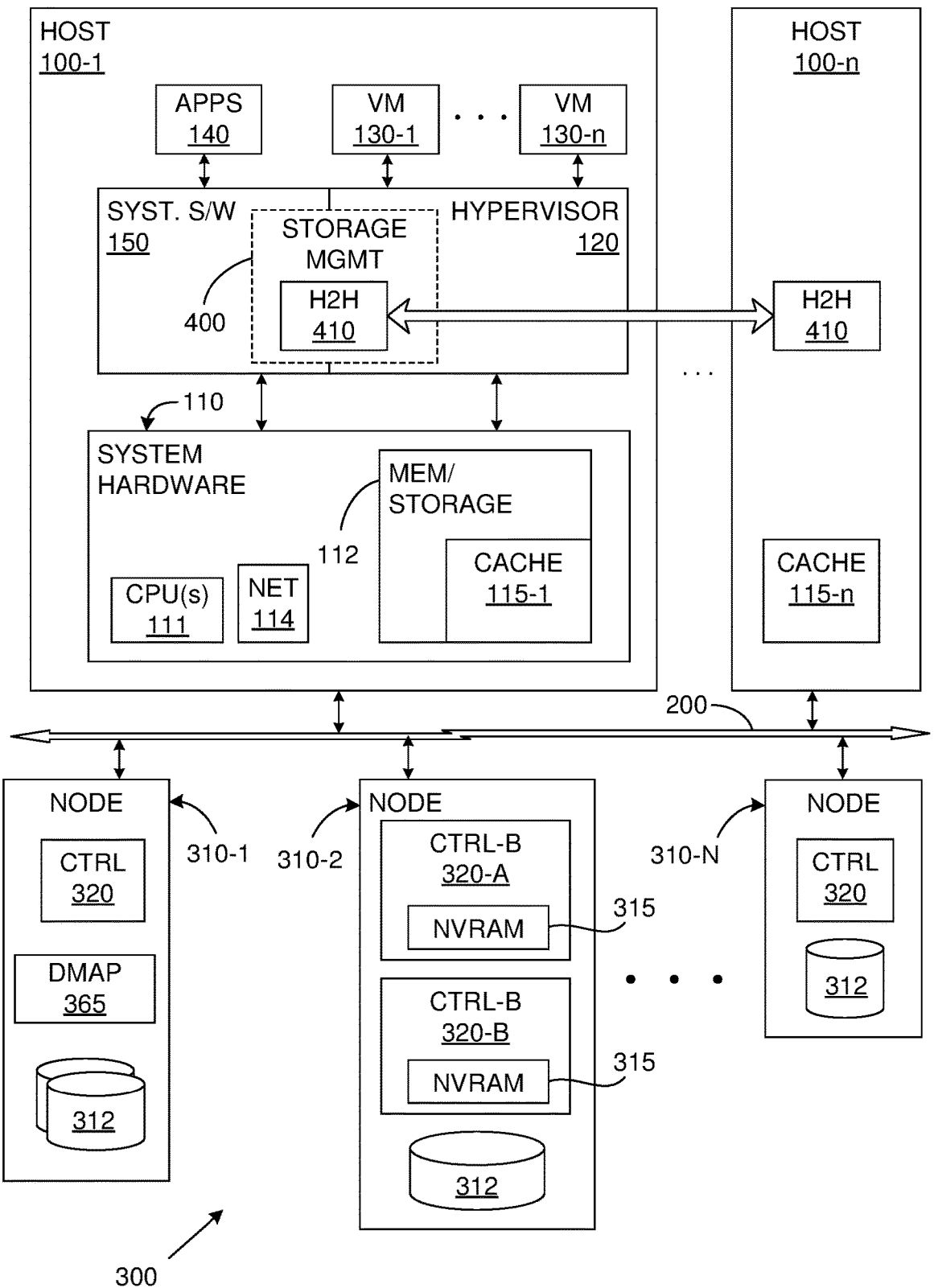
FIG. 1 illustrates the main hardware and software components of a distributed storage system.

FIG. 1 illustrates the main components of a basic embodiment of the invention, in which one or more hosts write data to one or more storage devices, which may be local to the hosts, or remote, or both. Each of two or more host platforms 100-1, . . . , 100-n (referenced collectively as 100), which may, and typically will be, servers, includes system hardware 110, including one or more processors (CPU's) 111, and some device(s) 112 for non-persistent, volatile and/or persistent, non-volatile, non-transitory storage. The line between what is a "storage device" and "memory" is no longer as bright as it once was, however (consider SSD and NVRAM technologies, for example) and the embodiments described here do not presuppose such a distinction.

The hardware 110 will also include other conventional mechanisms such as a network connection device 114 for transfer of data between the various components of the system and one or more network(s) 200, which may be any known public or proprietary local or wide-area network such as the Internet, an internal enterprise network, etc. Note that, depending on the implementation and nature of the system, the host(s) may even communicate with external entities, such as storage nodes 300, over different networks, thereby allowing some parallel operations. The only requirement is that, whatever network(s) is/are used, the host 100 should be able to transmit and receive data to and from the nodes 300 it needs to access. "The" network 200 is therefore to be read as the collection of whichever networks are implemented, along with any necessary switching or other communications devices if data needs to pass between different networks.

For the sake of simplicity, only host 100-1 is illustrated in detail in FIG. 1, but other hosts will typically have the same main components and structure. In particular, each host 100 includes a caching arrangement 115, or, in short, a "local cache". The local cache is illustrated as being part of the memory/storage sub-system 112; this is one option, but is not required in embodiments of the invention. In some systems, all or part of the local cache 115 could be embodied in separate hardware or software components. The cache 115 could be implemented with any conventional technology, including such modern, relatively fast technologies such as flash-based Solid State Disks (SSDs), phase change memory, Intel's new 3D XPoint memory, Dynamic Random Access Memory (DRAM), etc. In examples below, the local cache of the host 100-1 is numbered 115-1 and the cache of the host 100-n is numbered 115-n, and local caches in general are referred to as 115. When discussing data transfers in the examples given below, "local" is from the perspective of host 100-1, with other hosts (and their respective caches) being termed "remote" or "target" hosts/caches. However, of course each cache within a given host is "local" to that host.

Each host will also include conventional system software 150 such as, depending on the implementation, an operating system (OS) which includes a storage management software module 400, device drivers, etc. User-level applications 140 may then run in the known manner on the system software. If a host supports a virtualization platform, it will typically include some form of hypervisor 120, which forms the interface layer between the system hardware 110 and (in the illustrated embodiment) at least one virtual machine (VM) 130-1, . . . , 130-n (referenced collectively as 130).

As is well known, a VM is a software abstraction of an actual physical computer system, including virtual memory and virtual disk storage, typically with one or more levels of intermediate address mapping from the VM's address space to the address space managed by the actual host operating system. The VMs are shown in FIG. 1 as being within the host merely for simplicity—in most implementations, a virtual machine is a "guest" that is running on the hypervisor/hardware host. In some virtualized systems, a "virtual machine monitor" is included as an interface to underlying software layers, such as the hypervisor or a host OS. Many hypervisors, such as the ESX Server family of products of VMware, Inc, run directly on "bare metal", that is, directly on the system hardware 110, and themselves include some of the software components that in other systems are part of the system software 150. In other virtualization platforms, the hypervisor may run on or at the same level as the host OS, which supports and performs some operations upon calls from the hypervisor. The various embodiments of the invention described here do not depend on any particular virtualization architecture, whether for the VMs, the hypervisor(s) or other virtualization layers. Indeed, the invention does not presuppose VMs at all. Nonetheless, merely by way of example and for the sake of simplicity, VMs are described below as being the primary workloads for which the local cache is being used.

In embodiments of this invention, when an application or VM wants to save data persistently, it may write the data via, respectively, the system software 150 or hypervisor 120 to the storage management module 400, which processes the data for storage (see below for details) and forwards the processed data to other modules that actually write the data to a chosen persistent storage device, which may be local to the host or in a remote storage node. The storage management software module may also update metadata that enables it or another host to retrieve the correct data at a later time in response to a read request from an application or VM.

The nodes 310-1, 310-2, . . . , 310-N represent respective storage entities. Although not illustrated (merely for the sake of simplicity), each node will typically include one or more processors, as well as non-transitory, volatile or non-volatile storage for the executable code that the processor(s) execute to perform the steps used to implement embodiments of this invention. Each node will typically include one or more persistent storage devices 312 such as, for example, a disk drive, flash SSD, etc., as well as some form of storage controller 320, 320-A, 320-B, which includes controller software. Depending on other design considerations, nodes may include either a single controller (such as the illustrated 310-1 and 310-N), or multiple controllers (such as shown for 310-2). Controllers may include their own local high-speed storage such as NVRAM 315 available, for example, for local caching or caching for hosts or other nodes. In multi-controller nodes (310-2), each controller preferably includes a conventional high-speed communication link between the controllers. Even other implementations will typically have some form of controller, or at least controller software, which may be an operating system, or control software for some specialized hardware device within the node. From the perspective of the hosts, the collection of nodes may form a single yet distributed storage system, that is, a storage pool 300.

Although the techniques described below may be applied in other contexts as well, for the purpose of illustration they are described with relation to use in the system created by Datrium, Inc., which is the arrangement illustrated generally in FIG. 1 and other features of which are disclosed in the co-pending patent applications mentioned above. Below, for generality, the distributed virtual array (or whatever storage system the invention is implemented in) is abbreviated "DVX".

Furthermore, features of embodiments of the invention are described below primarily with reference to use with VM virtual disks, that is vDisks. This is by way of example only—the invention may also be used to advantage with files for processes, block storage logical units (such as Logical Unit Numbers—LUNs), etc., and with any form of writing entity, virtualized or not.

To provide resource isolation and to minimize chatter across hosts, embodiments of this invention thus maintain caches 115 local to hosts on which, for example, virtual machines (VMs) 130 execute. These caches are preferably managed individually by each host and contain, for example, data working sets of VMs executing on the host. To aid embodiments in capturing as much of the entire cumulative working set of all host VMs in local caches as possible, data reduction techniques such as inline compression and deduplication may be used.

While such an organization limits the network traffic and harnesses the benefits of local caching under the majority of operating conditions, in agile virtualization environments, VM migration (such as using the vMotion feature of VMware, Inc.) between hosts is occasionally desirable to balance CPU and memory load across the hosts or for a number of other VM management reasons. The vMotion operations that move VMs amongst hosts, for example, could be performed manually by a VM administrator or automatically by software such as the Distributed Resource Scheduler (DRS) in vSphere.

Although the techniques described below may be applied in other contexts as well, for the purpose of illustration they are described as they may be used in the Distributed Virtual Array system created by Datrium, Inc., which is discussed generally and with regard to particular features in other patent applications, such as the U.S. Patent Applications mentioned above. Below, the distributed virtual array (or whatever storage system the invention is implemented in) is abbreviated "DVX". Datrium DVX relies on host commodity cache for its normal operation. A durable data repository (for example, the "NetShelf" module provided by Datrium) may be provided to move data in and out via sequential streams. However, following a vMotion operation, a VM may simply continue its normal execution, which, in many cases, may result in an abundance of random IOs that cannot be satisfied by the local cache of the vMotion destination host.

Disclosed here is a technique referred to "Host-to-Host Transfer" (H2H), which ensures low latencies and high throughputs for a VM on the destination host, which is especially useful following vMotion. This is achieved by having the source and the destination hosts (for example, 100-1 and 100-n, respectively) temporarily cooperate until the working set of the executing VM is established on the destination host. Following a remote fetch from a vMotion source host, 100-1, fetched data is cached in the local cache 115-n of the vMotion destination host, 100-n.

Because, in the extreme, a VM may frequently migrate from one host to another, a set of optional optimizations is also disclosed to ensure reliable operation of H2H under different operating conditions.

Extended Attributes (xattrs)

At a high level, a Host-to-Host module 410 is consulted on a miss to the local cache 115-1 in order to potentially satisfy the miss from a remote cache 115-n before contacting slower storage media within one of the storage nodes 310-n or, if included at all, a slower portion of the local system 112. In FIG. 1, the H2H module 410 is illustrated as being a sub-component of the storage management component 400, but it could also be implemented as a body of executable code separate from it. The H2H module 410 preferably consults and updates a persistent extended attribute list for each virtual disk of a VM. Here, these attributes are referred to as H2H xattrs, or just xattrs. Xattrs may be stored in the underlying file system, in which case they will be as durable as any other file system meta-data and also accessible by all hosts that are part of the DVX. Each xattr preferably comprises a set of records, with each record capturing the information about a host that hosted that vDisk in the past. Examples of information contained in xattr may include: host name, vDisk flash footprint (an indication of how much data for the vDisk is cached in that host), an indication of when the host hosted the relevant vDisk, execution time, whether the vDisk is considered opened (and so likely to be updated on the host) or closed (no longer active) on this host, etc. xattr values for each vDisk may be periodically updated by the H2H module on the host executing the VM.

Thus, a set of records, which may, for example, be a table stored as a vDisk xattr as part of file system meta-data, reflects the execution history of the parent VM on potentially multiple hosts. To understand why this may be needed, suppose the VM moves from host A to B and shortly thereafter to C. Not all of the blocks may have migrated from A to B before the VM moved on to C such that C may look for some block and B doesn't have it. One way to handle this would be to treat this as an "extended miss" (a miss both in C and in B), and fetch the desired blocks from slower storage. Having multiple such xattrs, however, allows C to also ask A if it has the needed block in its flash cache. Recency may thus not always be the best indicator of the most efficient host from which to fetch desired blocks, but rather also the amount of required data remaining in the various hosts that have hosted it. Using xattrs as disclosed here allows one host to consider both factors in choosing a target host. Note that the DVX system is able to make such determinations without having to rely on a global data structure.

On a local cache miss, the H2H module 410 in the requesting host may thus examine a set of records in the xattr for the relevant vDisk to decide whether a remote flash fetch operation is desirable and if so, to select the target host. This decision may be made by determining if there was another host that had cached data for the vDisk recently and if that host cached a large amount of data such that it is probable that it still has the data. This time and amount information may be stored in the xattrs as mentioned above.

The mechanism of storing in xattrs information about how much data is cached for a particular vDisk by different hosts enables the H2H to take advantage of the cached data in another host in a very lightweight manner: In normal operation, there is no need to update all the other hosts with current cache content, which can have a significant impact on performance even when the system is not sharing data from one host to another. Content-addressability of the cache contents further optimizes this mechanism by removing the need to invalidate cache contents in other hosts as there are new overwrites in the local host. Note, however, that content-addressability is just one addressing scheme that may be used in embodiments of the invention. For example, each block could just have a typical LBA along with a generation number gen that is incremented every time the LBA is written to. A request would thus be for an LBA:gen# and the remote caches would also not have to be proactively invalidated.

Host Selection Policies

Now assume that a "local host", such as host 100-1, wishes to access a certain data block or set of data blocks blks. First, it may consult its local cache 115-1. But assume that it is expected to be faster to retrieve blks from the cache of one of the other hosts than from a storage node or a slower portion of its own cache. The question then becomes which other host, that is, which "target" host, is the most suitable to try to fetch blks from. The selection of the target host is complicated by the potential availability of many viable targets and the uncertainty as to whether any other host will even still have blks at all. Furthermore, one or more of the potential targets might behave as if a vDisk remains in active use on these hosts if they allow only read-only access to vDisks from different hosts.

One observation is that caches may often be multiple terabytes in size, such that it could take days for the data blks to age out. A host that has cached a data set such as blks will generally not evict that data unless it needs the space for some other data. If the cache is not under space pressure, the data could theoretically remain cached indefinitely.

Many viable policies could be used to facilitate the target-selection decision. Just a few example policies include: 1) choose a host with the largest flash footprint for a vDisk; or 2) the host where the vDisk was most recently opened; or 3) a host with the highest local hit rate in the past; or 4) a policy that combines some of these metrics using different weighting factors. Note that a remote host target selection may be done completely independently for each vDisk on each host and two vDisks of the same VM could potentially be prefetched from flash of two different hosts concurrently.

Figure 2:
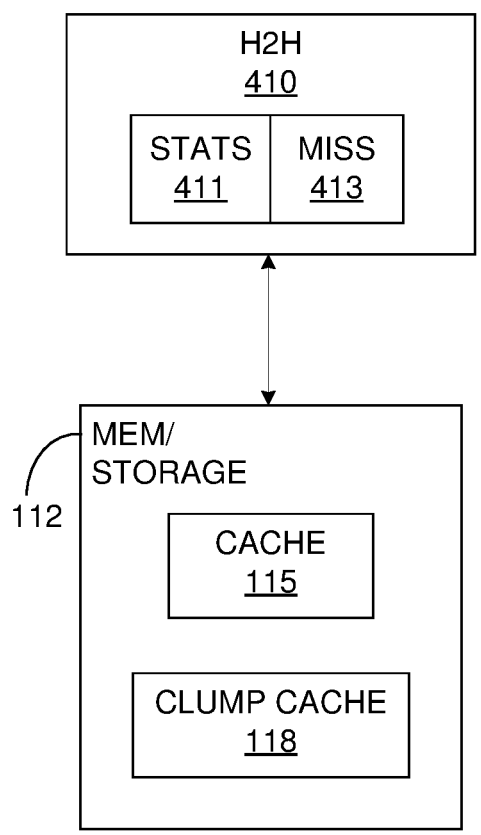
FIG. 2 shows various features (including some optional) of a cache arrangement.

Another policy decision is when to disable flash-to-flash transfer. Because the VM footprint in the source host flash might erode over time or the working set of a VM might shift following migration, the effectiveness of H2H may degrade over time. H2H adds an extra stage in I/O handling. If ineffective, it can increase latencies and create additional load on the vMotion source and destination hosts. The DVX therefore preferably maintains remote hit rates for each vDisk to decide when H2H becomes ineffective and needs to be disabled. This hit rate estimate should preferably be stable in the presence of small temporal working set shifts and could be computed via a number of techniques, such as estimate a remote hit rate over a moving time window; a hit rate over a moving window of last N accesses, perhaps weighted by the number of accesses per interval, etc. Different conventional mechanisms may be used to sense and compile hit/miss statistics for a cache, either as a whole, or by partition or component. In FIG. 2, a statistics module 411 is shown for this purpose within the H2H module 410, but any analogous component may be included elsewhere in the system instead, or in cooperation, such as within the cache 115.

Auxiliary Data Structures

The co-pending patent applications mentioned above introduce and, in different ways, use the notion of data "clumps", which are collections of constituent data blocks. In other words, according to those disclosures, data transfers are primarily at the granularity of clumps, which are generally an order of magnitude larger in size than individual VM blocks. In implementations of embodiments of this invention that are used within the DVX, while VMs may issue reads of arbitrary sizes, an advantageous but optional main unit of H2H transfer is a clump, which may also be compressed. Transferring clumps effectively transfers a batch of related blocks, which is more efficient than multiple transfers of individual blocks.

Several auxiliary data structures may be employed to increase the robustness of H2H. For example, a small content-addressable, in-memory clump cache 118 may be included to (a) avoid remote fetches of individual data blocks from the same clump concurrently; and (b) to satisfy subsequent data block accesses from RAM for workloads with good temporal and spatial locality. Workloads with good locality that issue multiple concurrent reads of blocks from the same clump may wait until H2H fetches the clump and thereby avoid multiple fetches of the same clump. By buffering/caching clumps in RAM, the system may not have to fetch the clump either from the remote cache again, or from the local flash cache, but instead can just return the requested block from the RAM cache of clumps.

For similar reasons, some embodiments include a negative cache, that is, a miss cache 413, of recent misses to avoid repeated remote fetch failures for workloads with spatial and temporal locality (blocks from the same missing clump accessed close in time).

Finally, H2H preferably disables any in-memory clump caching of remote fetches on the target host because the fetched data is cached by the local flash after the fetch.

Pref Etch and H2H

As described, H2H may be used to fetch data from a remote host's flash cache on demand. The data may then be cached in the cache of the host executing the VM. However, eager pref etch of the VM clumps prior to accesses could potentially reduce remote flash access time and reduce the time to re-establish a working set in the flash of the host executing the VM.

Extension to Read-Only Base Disk

As described, H2H naturally extends to handle another important virtualization use case: read-only-base disks. For example, in Virtual Desktop Infrastructure (VDI) environments, it is common to maintain a single "golden" OS disk image with multiple VMs accessing it in a read-only mode concurrently. Such a base vDisk is likely to be cached by some host's cache at all times. H2H will naturally fetch base disk data from that cache to satisfy the needs of VMs executing on other hosts. The xattr information for the "base vDisk" indicates to other hosts the best host to target for remote cache fetches if they wish to access data from the OS base disk image.

Multi-Cache Embodiment

In the embodiments of the invention illustrated in the figures and described above, each host has only a single cache 115. This is not a requirement; rather, any given host could have a hierarchy of cache technologies, such that the host first queries a local fast cache, then a remote fast cache, then a local slower cache, then a remote slower cache, etc., and finally the storage pool. Alternatively, a host could check all its local caches in order of performance before consulting any remote cache, and then the slower storage pool.

The invention claimed is:

1. In a system in which a plurality of host servers communicate with each other over one or more networks and access a common data storage pool, a data access method comprising:
    designating a single host server of the plurality of host servers to serve as currently-designated host for a particular data object;
    wherein the particular data object includes multiple data units;
    maintaining, hosting history metadata that includes metadata about one or more of the plurality of host servers that:
    during one or more periods prior to a migration operation, were designated as the currently-designated host for the particular data object, and are not, after the migration operation, the currently-designated host for the particular data object;
    responsive to a local host server being designated as the currently-designated host for the particular data object, initiating the migration operation;
    during the migration operation, migrating the particular data object to the local host server;
    while the particular data object is being migrated to the local host server, and one or more of the multiple data units of the particular data object reside in a host server of the plurality of host servers that is not the currently-designated host of the particular data object, receiving a request to access the one or more data units of the particular data object by an entity within the local host server;
    wherein the one or more data units requested by the request include a requested data unit;
    querying a local cache within the local host server to determine if the requested data unit is present;
    if the requested data unit is present in the local cache, fetching the requested data unit from the local cache;
    if the requested data unit is not present in the local cache, performing:
        inspecting the hosting history metadata maintained for the particular data object;
        based on the hosting history metadata, selecting at least one host server, that was the currently-designated host of the particular data object during a period prior to the migration operation, and that no longer is the currently-designated host of the particular data object, to query for the requested data unit;
        querying, over the one or more networks, a respective cache within the at least one host server, which is different from the local host server, to determine if the requested data unit of the particular data object is present remotely and, if so, fetching the requested data unit therefrom over the one or more networks;
    and if the requested data unit is not present in the respective cache of the at least one host server, fetching the requested data unit from the common data storage pool.

2. The method of claim 1, wherein querying the respective cache is performed using content addressing.

3. The method of claim 1, further comprising transferring data from the respective cache of the at least one host server at the granularity of clumps, each clump comprising a plurality of data blocks.

4. The method of claim 3, further comprising:
    configuring a content-addressable clump cache within a memory of the local host server, said content-addressable clump cache being separate from the local cache; and
    using a single clump from the clump cache to complete requests for access to multiple data units within the single clump from the clump cache.

5. The method of claim 1, wherein:
    a plurality of data objects are cached among the plurality of host servers; and
    the method further comprises storing, for each data object of the plurality of data objects, attribute information indicating which of the plurality of host servers are likely to be caching data units that belong to the data object.

6. The method of claim 5, further comprising:
storing for the particular data object, as part of the attribute information, estimates of how much of the particular data object each host server has in its local cache; and
in response to requests for data units from the particular data object, querying host servers, from the plurality of host servers, in an order dependent on the estimates of how much of the particular data object the host servers have in their respective local caches.

7. The method of claim 5, further comprising:
storing for the particular data object, as part of the attribute information, an indication of when each host server of the plurality of host servers was designated to serve as the currently-designated host for the particular data object prior to the migration operation; and
querying host servers, of the plurality of host servers, in an order that is a function of how recently prior to the migration operation each host server was designated to serve as the currently-designated host for the particular data object.

8. The method of claim 5, further comprising:
determining a local cache hit rate for data units of the particular data object within each host server on which data units of the particular data object are cached; and
querying host servers, of the plurality of host servers, in an order that is a function of the respective hit rates of the host servers being queried.

9. The method of claim 8, further comprising:
obtaining new hit rate information; and
updating the attribute information to reflect the new hit rate information.

10. The method of claim 5, in which the data object is a virtual disk for a virtual machine being migrated from at least one of the host servers, of the plurality of host servers, to the local host server.

11. The method of claim 5, in which the data object is a read-only-base disk.

12. The method of claim 11, in which the read-only-base disk is an operating system disk image of a virtual machine.

13. The method of claim 1 wherein:
the hosting history metadata includes, for each host server in a set of host servers that were previously designated to serve as the currently-designated host for the data object during a period prior to the migration operation, an indication of how much data of the particular data object is cached at the host server; and
selecting at least one host server to query is performed based, at least in part, on the indications, within the hosting history metadata, of how much data of the particular data object is cached at the host server.

14. The method of claim 1 wherein:
the hosting history metadata includes, for each host server in a set of host servers that were previously designated to serve as the currently-designated host for the data object during a period prior to the migration operation, an indication of when the host server was designated to serve as the currently-designated host for the particular data object; and
selecting at least one host server to query is performed based, at least in part, on the indications, within the hosting history metadata, of when the host server was designated to serve as the currently-designated host for the particular data object.

15. The method of claim 1 wherein:
the hosting history metadata includes, for each host server in a set of host servers that were previously designated to serve as the currently-designated host for the data object during a period prior to the migration operation, an indication of execution time associated with the particular data object; and
selecting at least one host server to query is performed based, at least in part, on the indications, within the hosting history metadata, of execution times associated with the particular data object.

16. One or more non-transitory computer-readable media storing instructions for use in a system in which a plurality of host servers communicate with each other over one or more networks and access a common data storage pool, wherein the instructions include instructions which, when executed by one or more computing devices, cause:
designating a single host server of the plurality of host servers to serve as currently-designated host for a particular data object;
wherein the particular data object includes multiple data units;
maintaining, hosting history metadata that includes metadata about one or more of the plurality of host servers that:
during one or more periods prior to a migration operation, were designated as the currently-designated host for the particular data object, and are not, after the migration operation, the currently-designated host for the particular data object;
responsive to a local host server being designated as the currently-designated host for the particular data object, initiating the migration operation;
during the migration operation, migrating the particular data object, to the local host server;
while the particular data object is being migrated to the local host server, and one or more of the multiple data units of the particular data object reside in a host server of the plurality of host servers that is not the currently-designated host of the particular data object, receiving a request to access the one or more data units of the particular data object by an entity within the local host server;
wherein the one or more data units requested by the request include a requested data unit;
querying a local cache within the local host server to determine if the requested data unit is present;
if the requested data unit is present in the local cache, fetching the requested data unit from the local cache;
if the requested data unit is not present in the local cache, performing:
inspecting the hosting history metadata maintained for the particular data object; based on the hosting history metadata, selecting at least one host server, that was the currently-designated host of the particular data object during a period before the migration operation, and that is no longer the currently-designated host of the particular data object, to query for the requested data unit;
querying, over the one or more networks, a respective cache within the at least one host server, which is different from the local host server, to determine if the requested data unit of the particular data object is present remotely and, if so, fetching the requested data unit therefrom over the one or more networks;

and if the requested data unit is not present in the respective cache of the at least one host server, fetching the requested data unit from the common data storage pool.

17. The one or more non-transitory computer-readable media of claim 16, wherein querying the respective cache is performed using content addressing.

18. The one or more non-transitory computer-readable media of claim 16, wherein the instructions further cause: transferring data from the respective cache of the at least one host server at the granularity of clumps, each clump comprising a plurality of data blocks.

19. The one or more non-transitory computer-readable media of claim 18, wherein the instructions further cause:
configuring a content-addressable clump cache within a memory of the local host server, said content-addressable clump cache being separate from the local cache; and
using a single clump from the clump cache to complete requests for access to multiple data units within the single clump from the clump cache.

20. The one or more non-transitory computer-readable media of claim 16, wherein:
a plurality of data objects are cached among the plurality of host servers; and
the instructions further cause: storing, for each data object of the plurality of data objects, attribute information indicating which of the plurality of host servers are likely to be caching data units that belong to the data object.

21. The one or more non-transitory computer-readable media of claim 20, wherein the instructions further cause:
storing for the particular data object, as part of the attribute information, estimates of how much of the particular data object each host server has in its local cache; and
in response to requests for data units from the particular data object, querying host servers, from the plurality of host servers, in an order dependent on the estimates of how much of the particular data object the host servers have in their respective local caches.

22. The one or more non-transitory computer-readable media of claim 20, wherein the instructions further cause:
storing for the particular data object, as part of the attribute information, an indication of when each host server of the plurality of host servers was designated to serve as the currently-designated host for the particular data object prior to the migration operation; and
querying host servers, of the plurality of host servers, in an order that is a function of how recently prior to the migration operation each host server was designated to serve as the currently-designated host for the particular data object.

23. The one or more non-transitory computer-readable media of claim 20, wherein the instructions further cause:
determining a local cache hit rate for data units of the particular data object within each host server on which data units of the particular data object are cached; and
querying host servers, of the plurality of host servers, in an order that is a function of the respective hit rates of the host servers being queried.

24. The one or more non-transitory computer-readable media of claim 23, wherein the instructions further cause:
obtaining new hit rate information; and
updating the attribute information to reflect the new hit rate information.

25. The one or more non-transitory computer-readable media of claim 20, in which the data object is a virtual disk for a virtual machine being migrated from at least one of the host servers, of the plurality of host servers, to the local host server.

26. The one or more non-transitory computer-readable media of claim 20, in which the data object is a read-only-base disk.

27. The one or more non-transitory computer-readable media of claim 26, in which the read-only-base disk is an operating system disk image of a virtual machine.

28. The one or more non-transitory computer-readable media of claim 16 wherein:
the hosting history metadata includes, for each host server in a set of host servers that were previously designated to serve as the currently-designated host for the data object during a period prior to the migration operation, an indication of how much data of the data object is cached at the host server; and
selecting at least one host server to query is performed based, at least in part, on the indications, within the hosting history metadata, of how much data of the particular data object is cached at the host server.

29. The one or more non-transitory computer-readable media of claim 16 wherein:
the hosting history metadata includes, for each host server in a set of host servers that were previously designated to serve as the currently-designated host for the data object during a period prior to the migration operation, an indication of when the host server was designated to serve as the currently-designated host for the data object; and
selecting at least one host server to query is performed based, at least in part, on the indications, within the hosting history metadata, of when the host server hosted was designated to serve as the currently-designated host for the data object.

30. The one or more non-transitory computer-readable media of claim 16 wherein:
the hosting history metadata includes, for each host server in a set of host servers that were previously designated to serve as the currently-designated host for the data object during a period prior to the migration operation, an indication of execution time associated with the particular data object; and
selecting at least one host server to query is performed based, at least in part, on the indications, within the hosting history metadata, of execution times associated with the particular data object.

* * * * *